(12) United States Patent
Scopesi et al.

(10) Patent No.: US 11,383,562 B2
(45) Date of Patent: Jul. 12, 2022

(54) VALVE ASSEMBLY AND TIRE INFLATION SYSTEM

(71) Applicant: DANA ITALIA S.R.L., Arco (IT)

(72) Inventors: Marco Scopesi, Rovereto (IT); Luca Gambini, Sant'Ambrogio di Valpolicella (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 17/217,945

(22) Filed: Mar. 30, 2021

(65) Prior Publication Data
US 2021/0300129 A1 Sep. 30, 2021

(30) Foreign Application Priority Data

Mar. 31, 2020 (EP) .................... 20167429

(51) Int. Cl.
*B60C 23/00* (2006.01)
*F16K 31/122* (2006.01)

(52) U.S. Cl.
CPC ........ *B60C 23/001* (2013.01); *F16K 31/1221* (2013.01); *F16K 31/1223* (2013.01); *F16K 31/1225* (2013.01); *B60C 2200/065* (2013.01)

(58) Field of Classification Search
CPC ........ B60C 23/00354; B60C 23/00372; B60C 23/00318; B60C 23/001; F16K 7/17; F16K 1/443; F16K 31/1225; F16K 31/1223; F16K 31/1221
See application file for complete search history.

(56) References Cited

U.S. PATENT DOCUMENTS

| 1,338,337 | A | * | 4/1920 | Stonestreet | ....... B60C 23/00318 152/418 |
| 2,148,246 | A | * | 2/1939 | Sanford | ............ B60C 23/00372 188/110 |
| 2,989,999 | A | * | 6/1961 | Holbrook | .......... B60C 23/00354 137/596.1 |
| 4,893,664 | A | * | 1/1990 | Oltean | .............. B60C 23/00318 137/859 |
| 5,180,456 | A | * | 1/1993 | Schultz | ............. B60C 23/00372 152/416 |
| 2017/0368896 | A1 | * | 12/2017 | Balistreri | .............. F16K 17/048 |

FOREIGN PATENT DOCUMENTS

| DE | 2826635 A1 * | 1/1980 | ....... B60C 23/00354 |
| WO | 2018082995 A1 | 5/2018 | |

* cited by examiner

*Primary Examiner* — Umashankar Venkatesan
(74) *Attorney, Agent, or Firm* — McCoy Russell LLP (57) ABSTRACT

Disclosed herein are valve assemblies, such as for use in a tire inflation system, the valve assemblies comprising: a first fluid port and a second fluid port fluidly connectable with one another via a fluid passage; a first valve having an open position and a closed position, the first valve in its closed position blocking the fluid passage and in its open position unblocking the fluid passage; a second valve having an open position and a closed position, the second valve in its closed position blocking the fluid passage and in its open position unblocking the fluid passage; and a control volume fluidly connected or fluidly connectable with the first fluid port via a flow restrictor, wherein the first valve, the second valve and the control volume are configured such that a fluid pressure in the control volume biases each of the first valve and the second valve toward their closed position.

18 Claims, 3 Drawing Sheets

VALVE ASSEMBLY AND TIRE INFLATION SYSTEM

CROSS-REFERENCE TO RELATED APPLICATION

The present application claims priority to European Patent Application No. 20167429.8, entitled "VALVE ASSEMBLY AND TIRE INFLATION SYSTEM," and filed on Mar. 31, 2020. The entire contents of the above-listed application are hereby incorporated by reference for all purposes.

TECHNICAL FIELD

The present disclosure relates to a valve assembly and to a tire inflation system including said valve assembly. For example, valve assemblies and tire inflation systems of the presently proposed type may be installed on working machines such as tractors, wheel loaders, dumpers, wheeled excavators, or the like.

BACKGROUND AND SUMMARY

Tire inflation systems may be utilized to measure and adjust the pneumatic pressure of a vehicle tire to improve the maneuverability of the vehicle and to reduce fuel consumption when the vehicle drives on different terrain types. For example, the pressure of a vehicle tire may be lowered to provide additional traction for the vehicle when the vehicle travels on soft terrain such as sand or mud, or the tire pressure may be raised to reduce the rolling resistance of the vehicle when the vehicle travels on an asphalt road. Tire inflation systems typically comprise a main fluid line for inflating and for deflating the tire, a wheel valve for controlling the processes of inflating and of deflating the vehicle tire, and a pilot fluid line for selectively opening and closing the wheel valve by applying a pilot pressure or a pilot pressure pulse to the wheel valve.

WO2018082995A1 discloses a valve assembly for use in a tire inflation system, the valve assembly comprising a first fluid port, a second fluid port, a movable member configured to be moved between an open position and a closed position, wherein when the movable member is in the open position the first fluid port is in fluid communication with the second fluid port, and wherein when the movable member is in the closed position the first fluid port is fluidly isolated from the second fluid port, a first pneumatic actuator in fluid communication with the first fluid port, the first pneumatic actuator configured to bias the movable member toward the open position, a second pneumatic actuator in fluid communication with the first fluid port, the second pneumatic actuator configured to bias the movable member toward the closed position, and a flow restrictor, wherein the first fluid port is in fluid communication with the second pneumatic actuator by way of the flow restrictor, for example at least when the movable member is in the open position. The valve assembly according to WO2018082995A1 may be operated using a single fluid line for both inflating and deflating the tire, and for piloting the valve assembly.

Based on the prior art the present disclosure addresses the problem of providing a valve assembly with improved functionality.

This problem is solved by a valve assembly according to the present disclosure, and by a tire inflation system including said valve assembly.

The presently proposed valve assembly, in particular for use in a tire inflation system, comprises: a first fluid port and a second fluid port fluidly connectable with one another via a fluid passage; a first valve having an open position and a closed position, the first valve in its closed position blocking the fluid passage and in its open position unblocking the fluid passage; a second valve having an open position and a closed position, the second valve in its closed position blocking the fluid passage and in its open position unblocking the fluid passage; and a control volume fluidly connected or fluidly connectable with the first fluid port via a flow restrictor, wherein the first valve, the second valve and the control volume are configured such that a fluid pressure in the control volume biases each of the first valve and the second valve toward their closed position.

Due to the fact that the presently proposed valve assembly includes a second valve for blocking and unblocking the fluid passage which is controllable via a fluid pressure in the control volume, the valve assembly has an improved functionality with respect to similar known valve assemblies.

The valve assembly may further comprise a valve body. The valve body may be made in one piece, or the valve body may include separate pieces connected together, for example by screws, bolts, or the like. The valve body may then comprise at least the first fluid port, the second fluid port and the control volume, or the first fluid port, the second fluid port and the control volume may then be formed within the valve body. The first valve may be at least partially disposed within the valve body. The first valve typically comprises a first movable member which is movable with respect to the valve body for selectively blocking and unblocking the fluid passage between the first fluid port and the second fluid port. The second valve may be at least partially disposed within the valve body. The second valve typically comprises a second movable member which is movable with respect to the valve body for selectively blocking and unblocking the fluid passage between the first fluid port and the second fluid port.

The first movable member may comprise a piston or a valve spool. The first valve or the first movable member may be configured and fluidly connected or fluidly connectable with the first fluid port in such a way that a fluid pressure at the first fluid port biases the first valve and/or the first movable member toward its open position. For example, this may allow the first valve from its closed position to its open position by applying a fluid pressure at the first fluid port or via the first fluid port.

Additionally or alternatively, the first valve and/or the first movable member may be configured and fluidly connected or fluidly connectable with the second fluid port in such a way that at least when the first valve is in its closed position, a fluid pressure at the second fluid port biases the first valve toward its open position. For example, a portion forming the fluid passage or a part thereof may form a first valve seat for the first movable member of the first valve so that the first movable member is pressed against this first valve seat when the first valve is in its closed position. In this way, the first valve may form a valve with particularly low leakage.

The first movable member may comprise an actuation surface comprising a first subarea and a second subarea. The first movable member may then further be configured and fluidly connected or connectable with the first and the second fluid port in such a way that when the first movable member is in its closed position, the first fluid port is fluidly connected or fluidly connectable with the first subarea and fluidly isolated from the second subarea and the second fluid port is fluidly connected or fluidly connectable with the second subarea and fluidly isolated from the first subarea. Or in other words, the first movable member may be configured such that when the first movable member is in its closed position, a fluid pressure at the first fluid port or provided via the first fluid port may exert an opening force on the first movable member via the first subarea, and a fluid pressure at the second fluid port or provided via the second fluid port may exert an opening force on the first movable member via the second subarea. The first movable member may then further be configured such that a component of the first subarea perpendicular to a direction of movement of the first movable member is larger than a component of the second subarea perpendicular to the direction of movement of the first movable member, preferably by a factor of four or more or by a factor of ten or more.

The valve assembly may further comprise a biasing member biasing the first valve and/or the first movable member toward its closed position. The biasing member may comprise a spring or another elastically compressible member. For example, the biasing member may be mounted on the valve body, or the biasing member may be completely or at least partially disposed within the valve body.

The second movable member of the second valve may comprise a piston or a deformable membrane disposed between the control volume and the fluid passage. For example, the second movable member may delimit the fluid passage and the control volume. The second valve and/or the second movable member and the fluid passage may be configured such that a fluid pressure in the fluid passage biases the second valve and/or the second movable member toward its open position. That is, the second valve and/or the second movable member may be fluidly connected or fluidly connectable with the first fluid port and/or to the second fluid port via the fluid passage in such a way that a fluid pressure at the first fluid port or provided via the first fluid port biases or may bias the second valve and/or the second movable member to its open position, and/or that a fluid pressure at the second fluid port or provided via the second fluid port biases or may bias the second valve and/or the second movable member to its open position. For example, a portion forming the fluid passage or a part thereof may form a second valve seat for the second movable member so that the second movable member is pressed against this second valve seat when the second movable member is in its closed position. The second valve and/or the second movable member may be biased toward its open position. For example, the valve assembly may comprise a further biasing member biasing the second valve and/or the second movable member toward its open position. And when the second movable member comprises a deformable membrane, the second valve and/or the second movable member may be biased toward its open position by an inherent stiffness of the deformable membrane.

The first valve, the second valve and the second fluid port may be configured or disposed such that when the second valve is in its closed position, the second valve fluidly isolates the second fluid port from the first valve and/or from the first movable member of the first valve. In particular, the second valve may be disposed in between the first valve and the second fluid port along the fluid passage selectively fluidly connecting the first fluid port with the second fluid port. And the first valve may be disposed in between the second valve and the first fluid port along the fluid passage selectively fluidly connecting the first fluid port with the second fluid port.

The valve assembly may further comprise a check valve selectively fluidly connecting the control volume with the second fluid port. In particular, the check valve may selectively fluidly connect the control volume with the second fluid port both when the second valve is in its open position and when the second valve is in its closed position. For example, the check valve may be configured to equalize a fluid pressure in the control volume biasing the second valve and/or the second movable member of the second valve toward its closed position and a fluid pressure in the fluid passage or at the second fluid port and biasing the second valve and/or the second movable member of the second valve toward its open position. Specifically, the check valve may be configured to allow a fluid flow through the check valve from the control volume toward the second fluid port, and to block a fluid flow through the check valve from the second fluid port toward the control volume.

The second valve and the fluid passage may be configured such that a maximum cross section of the second valve in its open position is smaller than a minimum cross section of a section of the fluid passage fluidly connecting the first valve with the second valve. In some embodiments, this may help closing the first valve and/or the second valve by keeping a fluid pressure in a section of the fluid passage fluidly connecting the second valve with the second fluid port at a high enough level to prevent the check valve from opening when the first valve is in its open position and the fluid passage is vented via the first fluid port. Also, the second valve and the fluid passage may be configured such that a maximum cross section of the second valve in its open position is smaller than a minimum cross section of a section of the fluid passage fluidly connecting the second fluid port with the second valve, for example at least by a factor of two, at least by a factor of five, or at least by a factor of ten.

The valve assembly may further comprise a third valve, an inlet port for connection with a pressure source such as a compressor, and a vent. The third valve may then be configured to selectively one of: fluidly connect the first fluid port with the inlet port and, simultaneously, fluidly isolate the first fluid port from the vent, and fluidly isolate the first fluid port from the inlet port and, simultaneously, fluidly connect the first fluid port with the atmosphere via the vent.

Additionally, the third valve may be configured to simultaneously fluidly isolate the first fluid port from both the inlet port and the vent.

The presently proposed tire inflation system for a vehicle comprises the previously described valve assembly, a pneumatic tire fluidly connected with the second fluid port of the valve assembly, and a pressure source such as a compressor. For pressurizing and for depressurizing the pneumatic tire, the first fluid port of the valve assembly is selectively fluidly connectable with the pressure source and with the atmosphere. For example, when the valve assembly comprises the above described third valve, the first fluid port of the valve assembly may be selectively fluidly connectable with the pressure source and with the atmosphere via said third valve. Typically, the third valve of the valve assembly is disposed on a stationary portion of the vehicle, and the first fluid port, the second fluid port, the fluid passage selectively fluidly connecting the first fluid port with the second fluid port, the first movable member and the second movable member are disposed on a vehicle wheel, wherein the vehicle wheel is rotatably mounted on the stationary portion of the vehicle or with respect to the stationary portion of the vehicle. Usually, the tire inflation system further comprises a rotary feedthrough, and the third valve and the first fluid port of the valve assembly are fluidly connected via said rotary feedthrough.

One method of operating the tire inflation system in order to deflate the pneumatic tire comprises the steps: fluidly connecting the first fluid port with the second fluid port via the fluid passage, and reducing a fluid pressure at the first fluid port below a tire pressure by fluidly connecting the first fluid port with the atmosphere to deflate the tire.

And another method of operating the tire inflation system in order to fluidly isolate the first fluid port from the second fluid port, comprises: fluidly isolating the first fluid port from the pressure source and from the atmosphere to let a fluid pressure in the control volume and a tire pressure equalize, and when a fluid pressure in the control volume is within a range of the tire pressure, for example within a predetermined range of the tire pressure, fluidly connecting the first fluid port with the atmosphere and reducing the fluid pressure at the first fluid port to move the first movable member toward the closed position.

BRIEF DESCRIPTION OF THE FIGURES

Embodiments of the presently proposed valve assembly and tire inflation system are described in the following detailed description and are depicted in the accompanying drawing in which.

DETAILED DESCRIPTION

Figure 1:
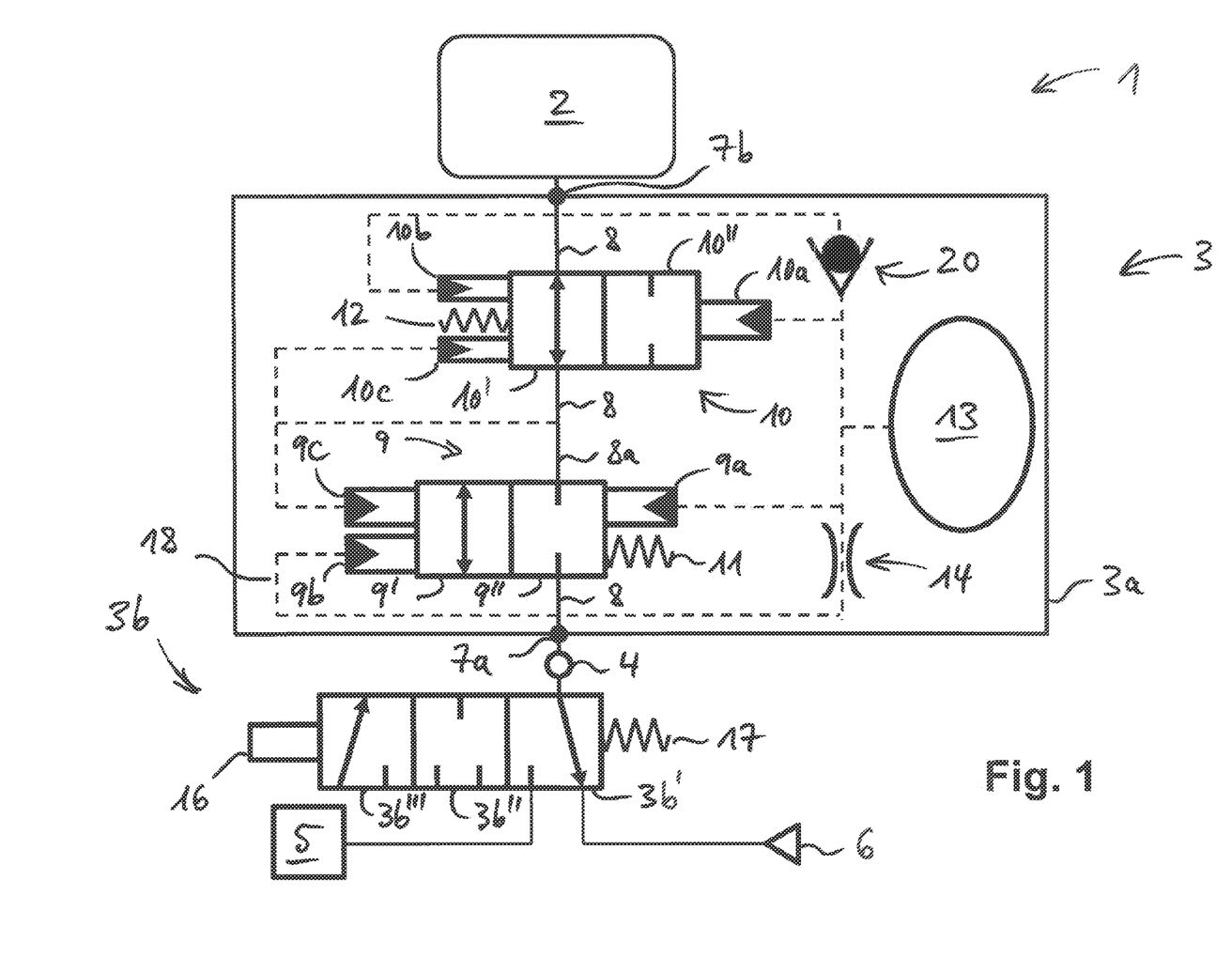
FIG. 1 schematically shows an embodiment of a tire inflation system of the presently proposed type.

FIG. 1 illustrates a schematic of an embodiment of a tire inflation system 1 of the presently proposed type. The tire inflation system 1 may be installed on a vehicle for controlling a pneumatic pressure of a vehicle tire. For example, the tire inflation system 1 may be installed on an off highway vehicle such as a tractor, a wheel loader, a dumper, a wheeled excavator, or the like. The tire inflation system 1 includes a pneumatic tire 2, a valve assembly 3 including a first valve 9 and a second valve 10, a rotary feedthrough 4, a pressure source 5 such as a compressor, and a vent 6. The valve assembly 3 selectively fluidly connects the tire 2 with the pressure source 5 and with the vent 6. For example, for inflating the tire 2 the valve assembly 3 may fluidly connect the tire 2 with the pressure source 5 and fluidly isolate the tire 2 from the atmosphere, and for deflating the tire 2 the valve assembly 3 may fluidly connect the tire 2 with the atmosphere via the vent 6 and fluidly isolate the tire 2 from the pressure source 5.

Typically, at least the pressure source 5 and the vent 6 are stationary with respect to a stationary portion of the vehicle such as a vehicle frame. For example, the pressure source 5 and the vent 6 may be connected to or mounted on the vehicle frame. On the other hand, the tire 2 and the valve assembly 3 or at least a portion of the valve assembly 3 are usually disposed on a vehicle wheel which is rotatable with respect to the stationary portion of the vehicle such as the vehicle frame. In the embodiment of the tire inflation system 1 depicted in FIG. 1, the valve assembly 3 also includes a portion which is mounted or disposed on the stationary portion of the vehicle, as will be described in more detail further below. The rotary feedthrough 4 provides fluid communication between the pressure source 5 and the vent 6 on the one hand, and the tire 2 on the other hand. The rotary feedthrough 4 may be of a known type. For example, the rotary feedthrough 4 may include sealing means such as a plurality of sealing rings mounted between a wheel hub and a vehicle axle and forming an annular sealing chamber between the wheel hub and the vehicle axle. For example, the sealing means of the rotary feedtrough 4 may be mounted on the wheel hub and may be in sliding sealing engagement with the vehicle axle, or the sealing means of the rotary feedthrough 4 may be mounted on the vehicle axle and may be in sliding sealing engagement with the wheel hub.

Figure 2:
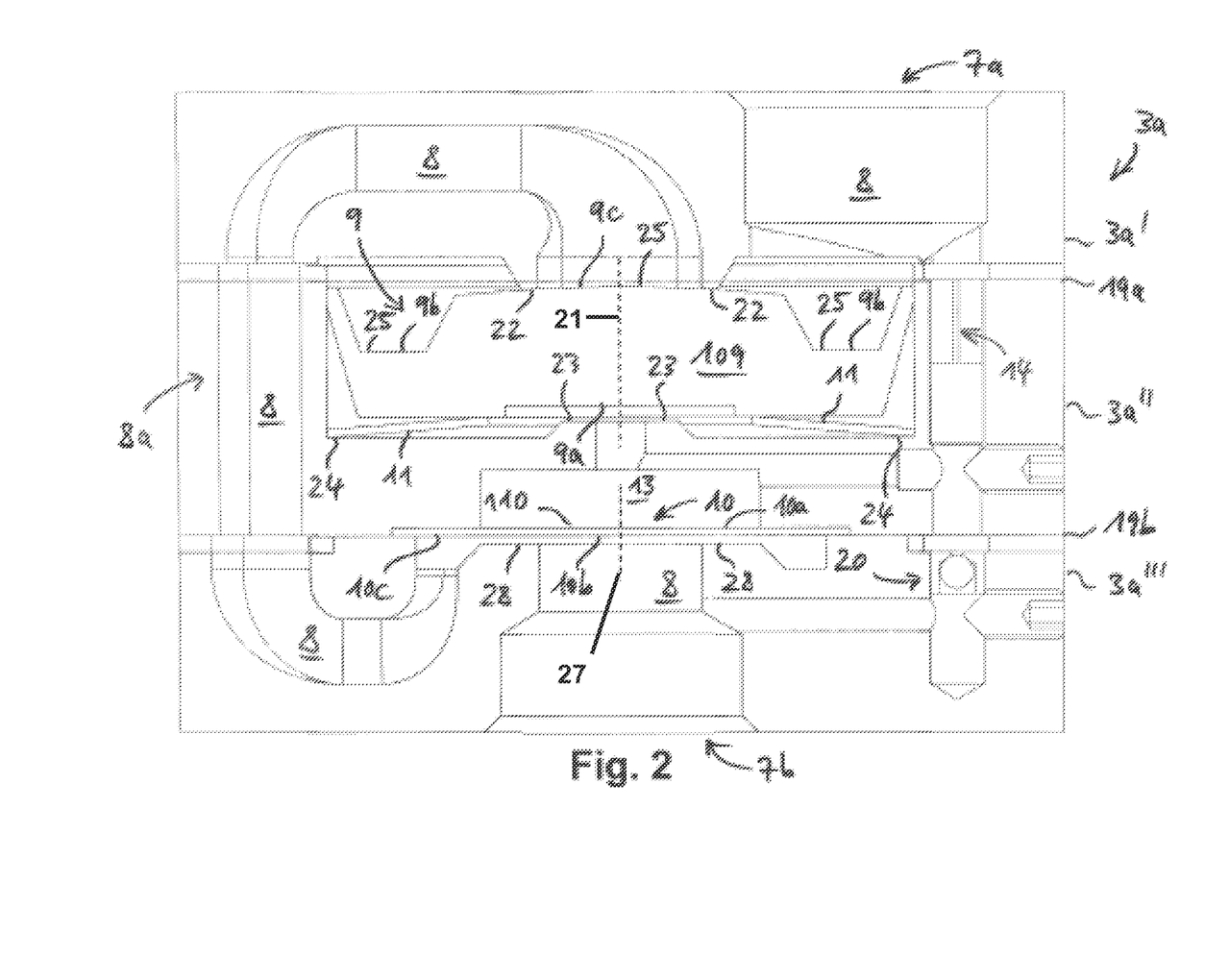
FIG. 2 schematically shows an embodiment of a valve assembly of the presently proposed type.

In the embodiment depicted in the figures, the valve assembly 3 includes a valve block 3a and a third valve 3b. Here, the valve block 3a is mounted on the vehicle wheel, and the third valve 3b is stationary with respect to the vehicle frame. The valve block 3a and the third valve 3b are in fluid communication with one another via the rotary feedthrough 4. The valve block 3a may be made in one piece, or the valve block 3a may include a plurality of separate pieces which may be connected to one another, for example via screws, bolts or other connecting means. The valve block 3a is typically made of or includes a rigid material such as metal and/or plastic. The valve block 3a includes a first fluid port 7a and a second fluid port 7b selectively fluidly connected with one another via a fluid passage 8. The first fluid port 7a is selectively fluidly connected with the pressure source 5 and with the vent 6 via the third valve 3b, and the second fluid port 7b is fluidly connected with the tire 2.

In the embodiment depicted in the figures, the valves 9, 10 are disposed within or mounted on the valve block 3a. The first valve 9 may be switched between an open position 9' and a closed position 9". For example, the first valve 9 may include a first movable member such as a piston, a spool or a deformable membrane. The first movable member may be configured such that when the first valve 9 is in its closed position 9" the first movable member blocks the fluid passage 8, and that when the first valve 9 is in its open position 9' the first movable member unblocks the fluid passage 8. The second valve 10 may be switched between an open position 10' and a closed position 10". For example, the second valve 10 may include a second movable member such as a piston, a spool or a deformable membrane. The second movable member may be configured such that when the second valve 10 is in its closed position 10" the second movable member blocks the fluid passage 8, and that when the second valve 10 is in its open position 10' the second movable member unblocks the fluid passage 8.

In the embodiment depicted in the figures, the third valve 3b includes a three port valve having three positions or configurations 3b', 3b", 3b'". In the first position or configuration 3b', the third valve 3b fluidly connects the first fluid port 7a of the valve assembly 3 with the atmosphere via the vent 6 and fluidly isolates the first fluid port 7a from the pressure source 5, as shown in FIG. 1. In the second position or configuration 3b", the third valve 3b fluidly isolates the first fluid port 7a of the valve assembly 3 from the pressure source 5 and from the vent 6. And in the third position or configuration 3b'", the third valve 3b fluidly connects the first fluid port 7a of the valve assembly 3 with the pressure source 5 and fluidly isolates the first fluid port 7a from the vent 6. The third valve 3b may be switched between the positions or configurations 3b', 3b", 3b'" by means of an actuator 16 such as a solenoid. The third valve 3b may be biased toward the first position or configuration 3b' by means of a biasing member 17 such as a spring.

The valves 9, 10 are disposed in series in between the first fluid port 7a and the second fluid port 7b along the fluid passage 8. The fluid ports 7a, 7b of the valve assembly 3 may be fluidly connected with one another via the fluid passage 8 by switching both valves 9, 10 to their open positions 9', 10'. And the fluid passage 8 may be blocked by switching one or both of the valves 9, 10 to their closed positions 9", 10". The fluid ports 7a, 7b, the fluid passage 8 and the valves 9, 10 are configured such that when the first valve 9 is in its closed position 9" the first valve 9 blocks the fluid passage 8 between the first fluid port 7a and the second valve 10, and that when the second valve 10 is in its closed position 10" the second valve 10 blocks the fluid passage 8 between the second fluid port 7b and the first valve 9.

In the embodiment depicted in the figures, the first valve 9 is configured as a normally closed valve biased toward its closed position 9" and the second valve 10 is configured as a normally open valve biased toward its open position 10'. For example, the valve assembly 3 may comprise a first biasing member 11 biasing the first valve 9 toward its closed position 9". The first biasing member 11 may include a spring or another elastically deformable member. And the valve assembly 3 may comprise a second biasing member 12 biasing the second valve 10 toward its open position 10'. For example, the second biasing member 12 may include a spring or another elastically deformable member.

The first valve 9 is configured as a pneumatically controllable valve. The first valve 9 comprises a pneumatic actuator 9a configured to bias the first valve 9 toward its closed position 9". The first valve 9 may further comprise one or more pneumatic actuators such as pneumatic actuators 9b, 9c configured to bias the first valve 9 toward its open position 9'. Similarly, the second valve 10 is configured as a pneumatically controllable valve. The second valve 10 comprises a pneumatic actuator 10a configured to bias the second valve 10 toward its closed position. And the second valve 10 may comprise one or more pneumatic actuators such as pneumatic actuators 10b, 10c configured to bias the second valve 10 toward its open position 10'.

The valve assembly 3 further comprises a control volume 13 and a flow restrictor 14. The control volume 13 is fluidly connected or fluidly connectable with the first fluid port 7a via the flow restrictor 14. The flow restrictor 14 may comprise an orifice, a throttle valve, or the like. In some embodiments, a minimum cross section of the flow restrictor 14 may be controllable so as to control a fluid flow through the flow restrictor 14. The flow restrictor 14 and the control volume 13 may be disposed or formed in the valve block 3a. The valve assembly 3 may further comprise a check valve 20 selectively fluidly connecting the control volume 13 with the second fluid port 7b. The check valve 20 is configured to allow a fluid flow through the check valve 20 from the control volume 13 toward the second fluid port 7b, and to block a fluid flow through the check valve 20 from the second fluid port 7b toward the control volume 13. When a fluid pressure in the control volume 13 is higher than a fluid pressure at the second fluid port 7b, fluid may flow from the control volume 13 toward the second fluid port 7b through the check valve 20 both when the second valve 10 is in its open position 10' and when the second valve 10 is in its closed position 10".

The pneumatic actuator 9a of the first valve 9 is fluidly connected or fluidly connectable with the first fluid port 7a via the flow restrictor 14. Further, the pneumatic actuator 9a of the first valve 9 is fluidly connected with the control volume 13 such that a fluid pressure in the control volume 13 biases the first valve 9 toward its closed position 9". And the pneumatic actuator 9b of the first valve 9 is fluidly connected with the first fluid port 7a. Specifically, the pneumatic actuator 9b of the first valve 9 is fluidly connected with the first fluid port 7a both when the first valve 9 is in its open position 9' and when the first valve 9 is in its closed position 9". A fluid pressure at the first fluid port 7a or applied via the first fluid port 7a biases the first valve 9 toward its open position 9'.

A minimum cross section of the flow restrictor 14 is smaller than a minimum cross section of a fluid connection 18 between the pneumatic actuator 9b of the first valve 9 and the first fluid port, for example by a factor of 10 or more, by a factor of 50 or more, or by a factor of 100 or more. In this manner, when a high fluid pressure is applied at the first fluid port 7a or via the first fluid port 7a, for example by means of the pressure source 5, the flow restrictor 14 is configured to delay an increase in fluid pressure in the control volume 13 and biasing the first valve 9 toward its closed position 9" via the pneumatic actuator 9a with respect to an increase in fluid pressure biasing the first valve 9 toward its open position 9' via the pneumatic actuator 9b. Thus, the first valve 9 may be switched to its open position 9' by applying a high fluid pressure, preferably a short high pressure pulse at the first fluid port 7a or via the first fluid port 7a. Similarly, when the first fluid port 7a is fluidly connected with a low pressure, for example by fluidly connecting the first fluid port 7a with the atmosphere via the vent 6, the flow restrictor 14 is configured to delay a decrease in fluid pressure in the control volume 13 and biasing the first valve 9 toward its closed position 9" via the pneumatic actuator 9a with respect to a decrease in fluid pressure biasing the first valve 9 toward its open position 9' via the pneumatic actuator 9b. Thus, the first valve 9 may be switched to its closed position 9" by lowering a fluid pressure at the first fluid port 7a, preferably by abruptly lowering a fluid pressure at the first fluid port 7a.

The pneumatic actuator 10a of the second valve 10 is fluidly connected or fluidly connectable with the first fluid port 7a via the flow restrictor 14. Further, the pneumatic actuator 10a of the second valve 10 is fluidly connected with the control volume 13 such that a fluid pressure in the control volume 13 biases the second valve 10 toward its closed position 10". And the pneumatic actuator 10b of the second valve 10 is fluidly connected with the second fluid port 7b. Specifically, the pneumatic actuator 10b of the second valve 10 is fluidly connected with the second fluid port 7b both when the second valve 10 is in its open position 10' and when the second valve 10 is in its closed position 10". A fluid pressure at the second fluid port 7b or applied via the second fluid port 7b biases the second valve 10 toward its open position 10'.

The pneumatic actuator 9c of the first valve 9 is fluidly connected with a section 8a of the fluid passage 8 in between the valves 9, 10. Thus, when the second valve 10 is in its open position 10' a fluid pressure at the second fluid port 7b or applied via the second fluid port 7b biases the first valve 9 toward its open position 9' via the pneumatic actuator 9c. Specifically, when the second valve 10 is in its open position 10' a fluid pressure at the second fluid port 7b or applied via the second fluid port 7b biases the first valve 9 toward its open position 9' via the pneumatic actuator 9c both when the first valve 9 is in its open position 9' and when the first valve 9 is in its closed position 9".

The pneumatic actuator 10c of the second valve 10 is fluidly connected with the section 8a of the fluid passage 8 in between the valves 9, 10. Thus, when the first valve 9 is in its open position 9' a fluid pressure at the first fluid port 7a or applied via the first fluid port 7a biases the second valve 10 toward its open position 10' via the pneumatic actuator 10c. Specifically, when the first valve 9 is in its open position 9' a fluid pressure at the first fluid port 7a or applied via the first fluid port 7a biases the second valve 10 toward its open position 10' via the pneumatic actuator 10c both when the second valve 10 is in its open position 10' and when the second valve 10 is in its closed position 10".

FIG. 2 schematically shows an embodiment of the valve block 3a of the valve assembly 3 of FIG. 1. Here and in the follow, the same or similar features recurring in different figures are designated with the same reference signs. The valve block 3a depicted in FIG. 2 comprises three parts 3a', 3a", 3a''' connected to one another, for example by means of screws or bolts (not shown). For instance, the parts 3a', 3a", 3a''' may be made of metal. Sealing members 19a, 19b disposed in between the parts 3a', 3a" and in between the parts 3a", 3a''' of the valve block 3a may seal an interior of the valve block 3a from the atmosphere surrounding the valve block 3a.

In FIG. 2, a first fluid port 7a, a second fluid port 7b and a fluid passage 8 selectively fluidly connecting the fluid ports 7a, 7b are formed in the valve block 3a. Furthermore, a control volume 13 and a flow restrictor 14 (such as an orifice, a throttle valve or a fluid channel with a reduced cross section) are formed in the valve block 3a. The control volume 13 is fluidly connected with the first fluid port 7a via the flow restrictor 14. A first valve 9 including a first movable member 109 (such as a piston) and a second valve 10 including a second movable member 110 are disposed or formed within the valve block 3a. In the embodiment depicted in FIG. 2, the second movable member 110 of the second valve 10 is configured as an elastically deformable membrane. It is understood that in other embodiments the second movable member 110 could be configured as a piston, a spool, or the like. As described above with respect to FIG. 1, the valves 9, 10 are disposed in series in between the first fluid port 7a and the second fluid port 7b along the fluid passage 8. Further, a check valve 20 selectively fluidly always connects the control volume 13 with the second fluid port 7b. The check valve 20 is configured to allow a fluid flow through the check valve 20 from the control volume 13 toward the second fluid port 7b, and to block a fluid flow through the check valve 20 from the second fluid port 7b toward the control volume 13.

The first movable member 109 of the first valve 9 is movable along a first valve axis 21. Specifically, the first movable member 109 is movable between two portions 22, 23 disposed on opposite sides of the first movable member 109 along the first valve axis 21. The portion 22 is formed by or within the valve block 3a. The portion 22 forms a first valve seat for the first movable member 109. The portion 22 forms a mechanical stop for a motion of the first movable member 109 in a first direction along the first valve axis 21. Similarly, the portion 23 is formed by or within the valve block 3a. The portion 23 forms a mechanical stop for a motion of the first movable member 109 in a second direction along the first valve axis 21 opposite the first direction.

When the first movable member 109 is pressed against the first valve seat formed by the portion 22 as shown in FIG. 2, the first movable member 109 blocks the fluid passage 8 and the first valve 9 is in its closed position 9'''. When the first valve 9 is in its closed position 9''', no fluid may flow from the first fluid port 7a to the second fluid port 7b via the fluid passage 8, and vice versa. When the first movable member 109 is lifted off the valve seat formed by the portion 22, the first movable member 109 unblocks the fluid passage 8 and the first valve 9 is in its open position 9' (not shown in FIG. 2). When the first valve 9 is in its open position 9', fluid may flow between the first fluid port 7a and the section 8a of the fluid passage 8 fluidly connecting the first valve 9 with the second valve 10.

The first movable member 109 has a first actuation surface 25 and a second actuation surface forming a pneumatic actuator 9a. The first actuation surface 25 is disposed on a side of the first movable member 109 along the first valve axis 21 facing the portion 22. The second actuation surface is disposed on a side of the first movable member 109 along the first valve axis 21 facing the portion 23. A fluid pressure acting on the first actuation surface 25 of the first movable member 109 or on a portion thereof biases the first movable member 109 to lift off the valve seat formed by the portion 22, thereby biasing the first valve 9 toward its open position 9'. And a fluid pressure acting on the second actuation surface of the first movable member 109 or on a portion thereof biases the first movable member 109 toward the valve seat formed by the portion 22, thereby biasing the first valve 9 toward its closed position 9'''.

The first actuation surface 25 of the first moveable member 109 or a portion thereof is fluidly connected with the first fluid port 7a and is selectively fluidly connected with the second fluid port 7b. The first actuation surface 25 of the first moveable member 109 has a first subarea forming a pneumatic actuator 9b and a second subarea forming a pneumatic actuator 9c. The second actuation surface of the first moveable member 109 or a portion thereof delimits the control volume 13 and is fluidly connected with the control volume 13. A minimum cross section of the flow restrictor 14 is smaller than a minimum cross section of a fluid connection 18 between the pneumatic actuator 9b of the first valve 9 and the first fluid port 7a, for example by a factor of 10 or more, by a factor of 50 or more, or by a factor of 100 or more. A biasing member 11 (such as a spring) is supported on a portion 24 formed by or within the valve block 3a. The biasing member 11 biases the first movable member 109 toward the first valve seat formed by the portion 22, thereby biasing the first valve 9 toward its closed position 9'''.

The first movable member 109, a fluid connection 18 between the first movable member 109 and the first fluid port 7a, and the fluid passage 8 are configured such that when the first movable member 109 is pressed against the portion 22 and the first valve 9 is in its closed position 9''', the portion 22 fluidly isolates the first fluid port 7a from the second subarea of the first actuation surface 25 forming the pneumatic actuator 9c. Thus, when the first movable member 109 is pressed against the portion 22 and the first valve 9 is in its closed position 9''', a fluid pressure at the first fluid port 7a or applied via the first fluid port 7a exerts an opening force on the first movable member 109 via the first subarea of the first actuation surface 25 forming the pneumatic actuator 9b, wherein the opening force biases the first movable member 109 to lift off the valve seat formed by the portion 22. A component of the first subarea forming the pneumatic actuator 9b perpendicular to the first valve axis 21 is larger than a component of the second subarea forming the pneumatic actuator 9c perpendicular to the first valve axis 21, for example at least by a factor of four or at least by a factor of ten.

Further, the first movable member 109, the second fluid port 7b, and the fluid passage 8 are configured such that when the first movable member 109 is pressed against the portion 22 and the first valve 9 is in its closed position 9''', the second fluid port 7b is fluidly connected or fluidly connectable with the second subarea of the first actuation surface 25 forming the pneumatic actuator 9c, and the portion 22 fluidly isolates the second fluid port 7b from the first subarea of the first actuation surface 25 forming the pneumatic actuator 9b. Thus, when the first movable member 109 is pressed against the portion 22 and the first valve 9 is in its closed position 9''', a fluid pressure at the second fluid port 7b or applied via the second fluid port 7b exerts an opening force on the first movable member 109 via the second subarea of the first actuation surface 25 forming the pneumatic actuator 9c, wherein the opening force biases the first movable member 109 to lift off the valve seat formed by the portion 22.

The second movable member 110 of the second valve 10 is movable along a second valve axis 27. In the embodiment depicted in FIG. 2, the first valve axis 21 and the second valve axis 27 are arranged in parallel. However, it is understood that in other embodiments the axes 21, 27 may be arranged differently with respect to one another. A portion of the elastically deformable membrane forming the second movable member 110 is movable or deformable along the second valve axis 27 toward a portion 28 formed by or within the valve block 3a. The portion 28 forms a valve seat for the second movable member 110. The portion 28 forms a mechanical stop for a motion of the second movable member 110 or a portion thereof along the second valve axis 27.

When the second movable member 110 or a portion thereof is pressed against the valve seat formed by the portion 28 (not shown in FIG. 2), the second movable member 110 blocks the fluid passage 8 and the second valve 10 is in its closed position 10''. When the second valve 10 is in its closed position 10'', no fluid may flow from the first fluid port 7a to the second fluid port 7b via the fluid passage 8, and vice versa. And when no net force is exerted on the second movable member 110 along the second valve axis 27, a stiffness of the elastically deformable membrane forming the second movable member 110 lifts the second movable member 110 off the valve seat formed by the portion 28, thereby biasing the second valve 10 toward its open position 10'. When the second valve 10 is in its open position 10', fluid may flow between the second fluid port 7b and the section 8a of the fluid passage 8 fluidly connecting the first valve 9 with the second valve 10.

The second movable member 110 has a first actuation surface 10b and a second actuation surface 10a disposed on axially opposing sides of the second movable member 110 along the second valve axis 27. The first actuation surface 10b is disposed on a side of the second movable member 110 along the second valve axis 27 facing the portion 28. The second actuation surface 10a is disposed on a side of the second movable member 110 along the second valve axis 27 facing the control volume 13. The second actuation surface 10a delimits the control volume 13. The first actuation surface 10b or a portion thereof is fluidly connected with the second fluid port 7b and with the section 8a of the fluid passage 8 fluidly connecting the valves 9, 10. A fluid pressure acting on the first actuation surface 10b of the second movable member 110 or on a portion thereof biases the second movable member 110 to lift off the valve seat formed by the portion 28, thereby biasing the second valve 10 toward its open position 10'. And a fluid pressure acting on the second actuation surface 10a of the second movable member 110 biases the second valve 10 toward its closed position 10''. In the embodiment depicted in FIG. 3, a maximum cross section of the second valve 10 in its open position 10', specifically a cross section of a passage formed in between the second movable member 110 and the portion 28, is smaller than a minimum cross section of the section 8a of the fluid passage 8 fluidly connecting the valves 9, 10, for example at least by a factor of two, at least by a factor of 5, or at least by a factor of 10.

Figure 3:
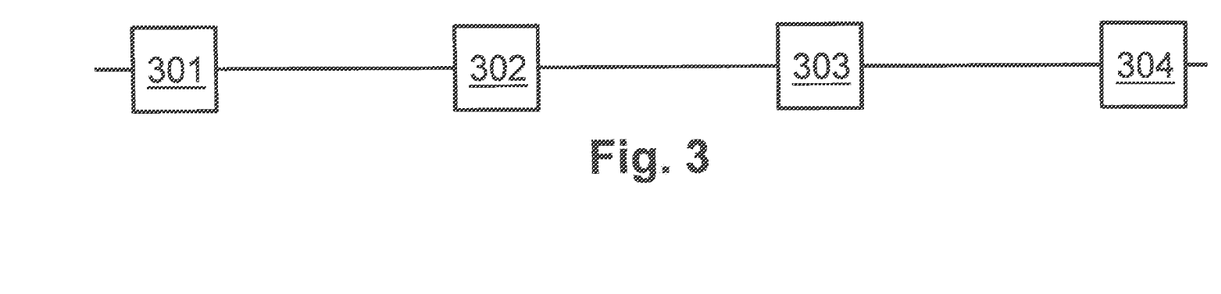
FIGS. 3-5 schematically illustrate methods of operating the tire inflation system of FIG. 1.

FIG. 3 schematically illustrates a flow diagram including steps of operating the tire inflation system 1 of FIG. 1 in order to inflate the pneumatic tire 2 via the valve assembly 3. Initially, at 301, the first valve 9 is in its closed position 9''' and the third valve 3b is in its first position 3b' fluidly connecting the first fluid port 7a with the atmosphere via the vent 6. The first fluid port 7a is at atmospheric pressure. The second valve 10 is in its open position 10'. Subsequently, at 302, the third valve 3b is switched to its third position 3b''' to fluidly connect the first fluid port 7a with the pressure source 5. Subsequently, at 303, the pressure source 5 pressurizes the first fluid port 7a, thereby moving the movable member 109 of the first valve 9 toward its open position 9' to fluidly connect the fluid ports 7a, 7b with one another. And subsequently, at 304, the pressure source 5 pressurizes the pneumatic tire via the fluid passage 8, thereby inflating the tire 2. During this operation the check valve 20 guarantees that a fluid pressure in the control volume 13 does not exceed threshold pressure at which the fluid pressure in the control volume 13 may press the second movable member 110 against the portion 28, thereby closing the second valve 10 and interrupting the fluid flow into the tire 2.

Figure 4:
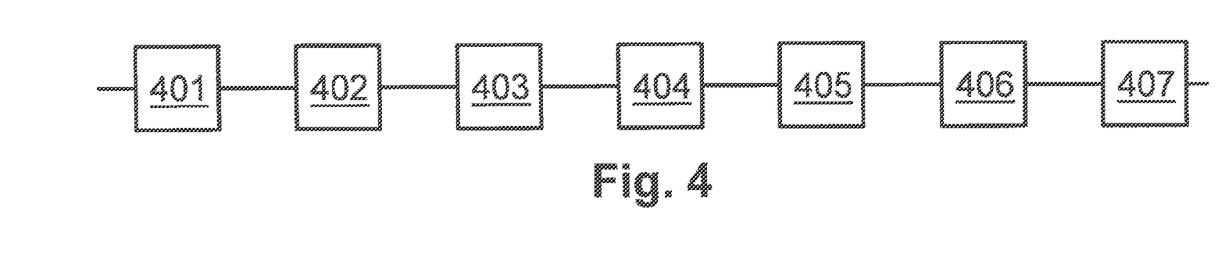

FIG. 4 schematically illustrates a flow diagram including steps of operating the tire inflation system 1 of FIG. 1 in order to close the first valve 9 to fluidly isolate the fluid ports 7a, 7b from one another. Initially, at 401, the valves 9, 10 are in their open positions 9', 10' and a fluid such as air is flowing between the fluid ports 7a, 7b via the fluid passage 8. Subsequently, at 402, the third valve 3b is switched to its second position 3b'', thereby fluidly isolating the first fluid port 7a from the pressure source 5 and from the atmosphere. Subsequently, at 403, the third valve 3b in its second position 3b'' causes the fluid pressure within the tire 2 and the fluid pressure within the valve block 3a including within the fluid passage 8 and within the control volume 13 to equalize. As the flow restrictor 14 may delay the pressure equalization between the fluid passage 8 and the control volume 13, the third valve 3b should preferably be kept in its second position 3b'' for a sufficiently long period of time to allow the fluid pressure in the control volume 13 and the fluid passage 8 to equalize or to allow a pressure difference between the fluid passage 8 and the control volume 13 to drop below a threshold pressure difference. Subsequently, at 404, the third valve 3b is switched to its first position 3b' to fluidly connect the first fluid port 7a with the atmosphere via the vent 6.

Subsequently, at 405, the fluid pressure at the first fluid port 7a drops, causing a fluid flow from the second fluid port 7b toward the vent 6 via the first fluid port 7a. As the flow restrictor 14 delays the pressure decrease in the control volume 13 with respect to the pressure decrease at the first fluid port 7a and at least within the section 8a of the fluid passage 8, subsequently, at 406 the pressure differential between the control volume 13 and the section 8a of the fluid passage 8 presses the second movable member 110 against the portion 28, thereby closing the second valve 10 and interrupting fluid flow from the second fluid port 7b toward the first fluid port 7a. In this situation, the fact that the maximum cross section of the second valve 10 in its open position 10', more specifically the cross section of the passage between the movable member 110 and the portion 28, is smaller than the minimum cross section of the section 8a of the fluid passage 8 prevents the fluid pressure at the second fluid port 7b from dropping immediately, thereby keeping the check valve 20 closed, in particular long enough for the second valve 10 to close.

As the second valve 10 in its closed position 10" fluidly isolates the pneumatic actuator 9c of the first valve 9 from the second fluid port 7b and the tire 2 (see FIGS. 1 and 2), the closing of the second valve 10 reduces an opening force applied to the first movable member 109 of the first valve 9 via the pneumatic actuator 9c of the first valve 9. And subsequently, at 407, the fluid pressure at the first fluid port 7a drops below a threshold value, thereby allowing the biasing member 11 to push the first movable member 109 of the first valve 9 against the portion 22 and to close the first valve 9.

Figure 5:
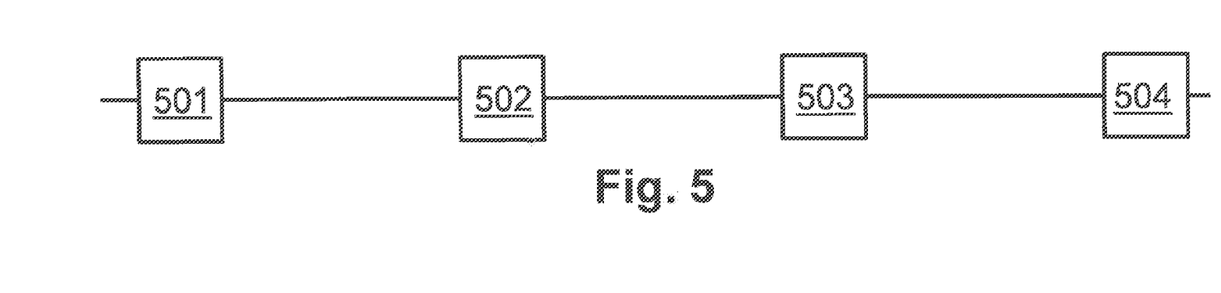

FIG. 5 schematically illustrates a flow diagram including steps of operating the tire inflation system 1 of FIG. 1 in order to deflate the pneumatic tire 2 via the valve assembly 3. Initially, at 501, the first valve 9 is in its closed position 9" and the third valve 3b is in its first position 3b' fluidly connecting the first fluid port 7a with the atmosphere via the vent 6. The first fluid port 7a is at atmospheric pressure. The second valve 10 is in its open position 10'. Subsequently, at 502, the third valve 3b is switched to its third position 3b''' to fluidly connect the first fluid port 7a with the pressure source 5. Subsequently, at 503, the pressure source 5 pressurizes the first fluid port 7a, thereby moving the first movable member 109 of the first valve 9 toward its open position 9' to fluidly connect the fluid ports 7a, 7b with one another. Preferably, the pressure pulse applied by the pressure source 5 at 503 is long and/or strong enough to lift the first movable member 109 off the portion 22 to open the first valve 9, and short enough in order in order not to raise the fluid pressure within the control volume 13 above a maximum value, for example near atmospheric pressure. And subsequently, at 504, the third valve 3b is against switched to its first position 3b', thereby fluidly connecting the first fluid port 7a with the atmosphere via the vent 6.

Preferably, at 504, the fluid pressure at the first fluid port 7a is lowered slowly enough to prevent the first valve 9 from closing. For example, the third valve 3b may be configured as a proportional valve that allows controlling a minimum cross section of the third valve 3b when the third valve 3b is in its first position 3b'. Alternatively, the valve assembly 3 may include an additional proportional valve fluidly connecting the first fluid port 7a with the vent 6. And subsequently, at 505, the fluid pressure at the first fluid port 7a may be lowered further below a threshold value to allow the biasing member 11 to close the first valve 9.

Important design parameters of the valve assembly 3 are the maximum allowed tire pressure and the minimum allowed tire pressure. If or when the pressure in the tire 2 is too high, the first valve 9 may open and allow the tire 2 to deflate. And if or when the tire 2 is deflated and a pressure inside the tire 2 is too low, a counter pressure acting on the first movable member 109 via the pneumatic actuators 9b, 9c may not suffice to keep the first valve 9 in its open position 9'. The relevant relations or equations are $$F_{11} > A_{9c} \cdot P_{max}; \text{ and} \qquad (1)$$

$$F_{11} < (A_{9b} - A_{9a}) \cdot P_{min}, \qquad (2)$$

where $F_{11}$ is the preload of the biasing member 11 biasing the first valve 9 toward its closed position 9", $A_{9a}$ is the component of the area of the pneumatic actuator 9a perpendicular to the first valve axis 21 when the first valve 9 is fully open and the first movable member 109 is pressed against the portion 23, $A_{9b}$, $A_{9c}$ are the components of the areas of the pneumatic actuators 9a-9c perpendicular to the first valve axis 21 as depicted in FIG. 2, and $P_{min}$ and $P_{max}$ are the minimum tire pressure and the maximum tire pressure, respectively. If the values of $P_{min}$ and $P_{max}$ are used as the design inputs, the above equations (1) and (2) may be combined as follows to provide the feasible range for the preload of the biasing member 11 and the relative areas of the pneumatic actuators 9a-9c of the first movable member 109:

$$(A_{9b} - A_{9a})/A_{9c} > P_{max}/P_{min}. \qquad (3)$$

If $A_{9a}$ and $A_{9b}$ are chosen such that $A_{9b} \gg A_{9a}$, equation (3) can be approximated by:

$$A_{9b}/A_{9c} > P_{max}/P_{min}. \qquad (3')$$

Typical values for $P_{min}$ and $P_{max}$ may be $P_{min} = 0.3$ Mpa and $P_{max} = 0.03$ Mpa, for example. However, it is understood that other values may be used.

The invention claimed is:

1. A valve assembly for use in a tire inflation system, the valve assembly comprising:
    a first fluid port and a second fluid port fluidly connectable with one another via a fluid passage;
    a first valve having an open position and a closed position, the first valve blocking the fluid passage in its closed position and not blocking the fluid passage in its open position unblocking;
    a second valve having an open position and a closed position, the second valve blocking the fluid passage in its closed position and not blocking the fluid passage in its open position; and
    a control volume fluidly connected or fluidly connectable with the first fluid port via a flow restrictor,
    wherein a fluid pressure in the control volume biases each of the first valve and the second valve toward their closed position.

2. The valve assembly of claim 1, wherein the first valve is fluidly connected or fluidly connectable with the first fluid port to bias the first valve toward its open position via a fluid pressure at the first fluid port.

3. The valve assembly of claim 2, wherein the first valve comprises a first movable member for selectively blocking and unblocking the fluid passage, wherein the first movable member has an actuation surface comprising a first subarea and a second subarea, and wherein when the first valve is in its closed position, the first fluid port is fluidly connected or fluidly connectable with the first subarea and fluidly isolated from the second subarea, and the second fluid port is fluidly connected or fluidly connectable with the second subarea and fluidly isolated from the first subarea.

4. The valve assembly of claim 3, wherein a component of the first subarea perpendicular to a direction of movement of the first movable member is larger than a component of the second subarea perpendicular to the direction of movement of the first movable member, by a factor of four or more.

5. The valve assembly of claim 1, wherein the first valve is fluidly connected or fluidly connectable with the second fluid port to bias the first valve toward its open position via a fluid pressure at the second fluid port when the first valve is in its closed position.

6. The valve assembly of claim 5, wherein the first valve comprises a first movable member for selectively blocking and unblocking the fluid passage, wherein the first movable member has an actuation surface comprising a first subarea and a second subarea, and wherein when the first valve is in its closed position, the first fluid port is fluidly connected or fluidly connectable with the first subarea and fluidly isolated from the second subarea, and the second fluid port is fluidly connected or fluidly connectable with the second subarea and fluidly isolated from the first subarea.

7. The valve assembly of claim 6, wherein a component of the first subarea perpendicular to a direction of movement of the first movable member is larger than a component of the second subarea perpendicular to the direction of movement of the first movable member, by a factor of four or more.

8. The valve assembly of claim 1, further comprising a biasing member biasing the first valve toward its closed position.

9. The valve assembly of claim 1, wherein a fluid pressure in the fluid passage biases the second valve toward its open position.

10. The valve assembly of claim 1, wherein when the second valve is in its closed position, the second valve fluidly isolates the second fluid port from the first valve.

11. The valve assembly of claim 1, wherein a maximum cross section of the second valve in its open position is smaller than a minimum cross section of a section of the fluid passage fluidly connecting the first valve with the second valve.

12. The valve assembly of claim 1, further comprising a check valve selectively fluidly connecting the control volume with the second fluid port, wherein when the second valve is in its closed position, the check valve allows a fluid flow through the check valve from the control volume toward the second fluid port, and blocks a fluid flow through the check valve from the second fluid port toward the control volume.

13. The valve assembly of claim 1, further comprising a third valve, an inlet port for connection with a pressure source, and a vent, the third valve to selectively fluidly connect the first fluid port with the inlet port and, simultaneously, fluidly isolate the first fluid port from the vent.

14. The valve assembly of claim 13, the third valve to selectively fluidly isolate the first fluid port from the inlet port and, simultaneously, fluidly connect the first fluid port with the atmosphere via the vent.

15. The valve assembly of claim 14, wherein the third valve simultaneously fluidly isolates the first fluid port from both the inlet port and the vent.

16. A tire inflation system, comprising:
a valve assembly for use in a tire inflation system, the valve assembly comprising:
   a first fluid port and a second fluid port fluidly connectable with one another via a fluid passage;
   a first valve having an open position and a closed position, the first valve blocking the fluid passage in its closed position and not blocking the fluid passage in its open position unblocking;
   a second valve having an open position and a closed position, the second valve blocking the fluid passage in its closed position and not blocking the fluid passage in its open position; and
   a control volume fluidly connected or fluidly connectable with the first fluid port via a flow restrictor,
   wherein a fluid pressure in the control volume biases each of the first valve and the second valve toward their closed position;
a pneumatic tire fluidly connected with the second fluid port of the valve assembly; and
a pressure source,
wherein the first fluid port of the valve assembly is selectively fluidly connectable with the pressure source and with the atmosphere for pressurizing and for depressurizing the pneumatic tire.

17. A method of operating the tire inflation system of claim 16 to deflate the pneumatic tire, the method comprising:
   fluidly connecting the first fluid port with the second fluid port via the fluid passage; and
   reducing a fluid pressure at the first fluid port below a tire pressure by fluidly connecting the first fluid port with the atmosphere to deflate the tire.

18. A method of operating the tire inflation system of claim 16 to fluidly isolate the first fluid port from the second fluid port, comprising:
   fluidly isolating the first fluid port from the pressure source and from the atmosphere to let a fluid pressure in the control volume and a tire pressure equalize; and
   when a fluid pressure in the control volume is within a range of the tire pressure, fluidly connecting the first fluid port with the atmosphere and reducing the fluid pressure at the first fluid port to move the first valve toward its closed position.

* * * * *